Aug. 15, 1950  D. JASSY  2,519,191
ALIDADE BEARING INDICATOR
Filed Aug. 9, 1945  2 Sheets-Sheet 1
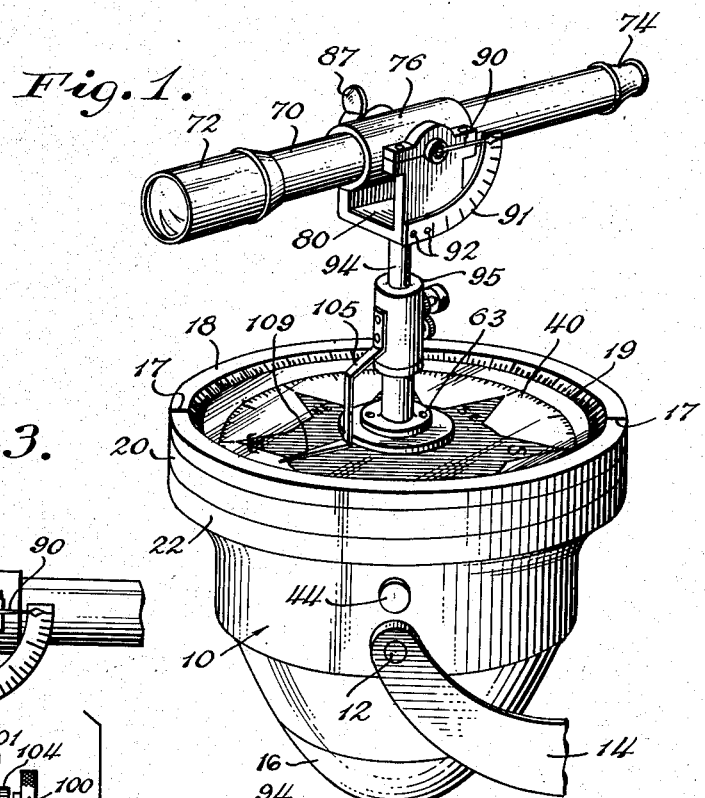
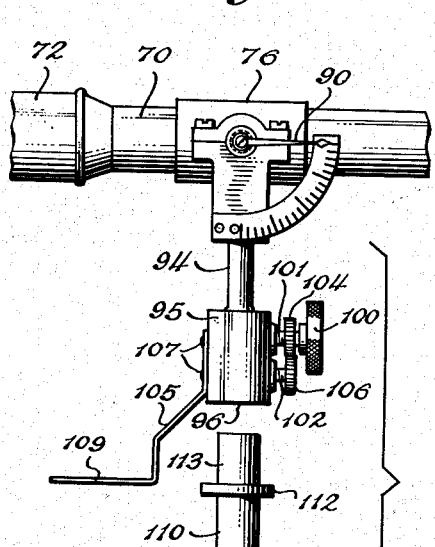
INVENTOR
DAVID JASSY
BY Herbert P. Thompson
his ATTORNEY.

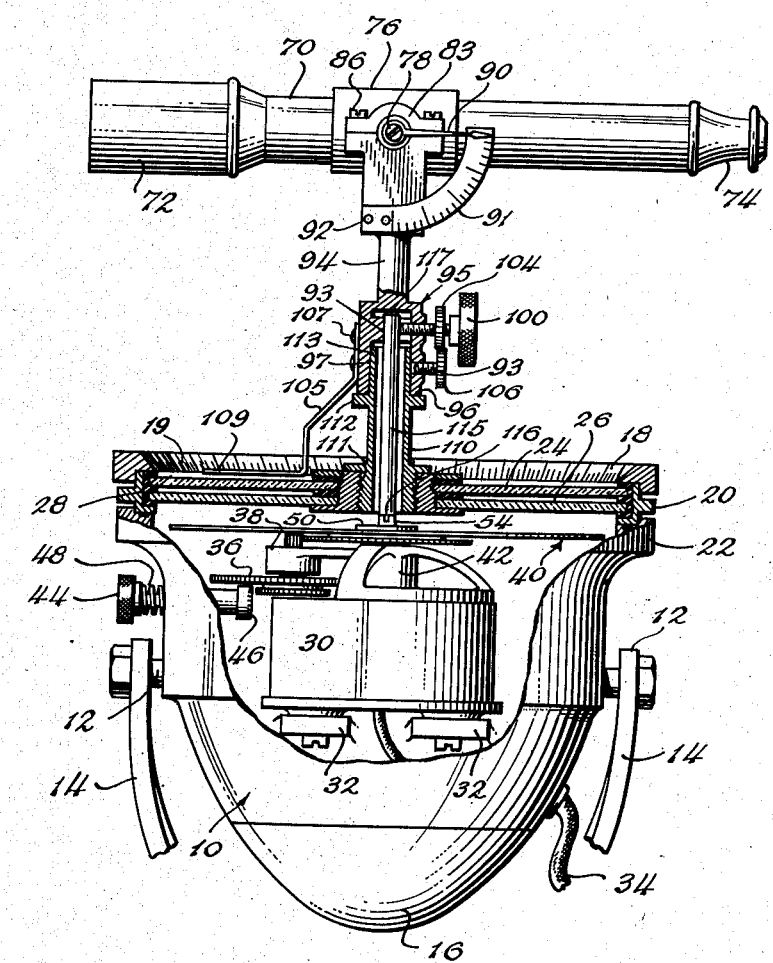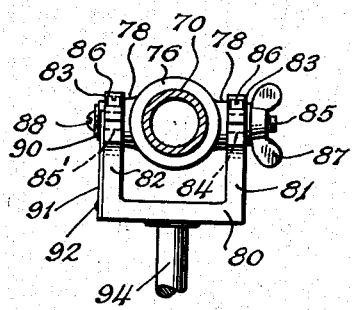

Patented Aug. 15, 1950

2,519,191

UNITED STATES PATENT OFFICE 2,519,191

ALIDADE BEARING INDICATOR

David Jassy, Detroit, Mich.

Application August 9, 1945, Serial No. 609,783

4 Claims. (Cl. 33—72)

This invention relates to improvements in direction and bearing indicators especially adapted to be used on ships and water craft generally. More particularly, the invention relates to alidades adapted to be mounted on a repeater compass of simplified and improved construction.

In the navigation of small vessels which do not carry standard navigation equipment including standard alidades, it is desirable to provide means for aiding in taking bearings in celestial navigation, piloting, and radio direction finder calibration. Under celestial navigation, a navigator should be in a position to obtain the approximate altitude of stars; exact azimuth bearing of stars; to locate known stars; and to locate Venus in the day time. For piloting, a navigator or pilot requires that his bearings be accurate, which is not possible with the conventional bearing or azimuth circle. Additionally, the calibration of radio direction finder bearings should be accurate and should be made instantaneously, which is not possible with the use of the standard bearing circle. One man reads bearings while a co-worker follows the reference object with a telescope. Additionally, in the calibration of radio direction finding instruments and the taking of bearings, a ship is required to be at a considerable distance from the sending station in order to obtain as accurate a "fix" as possible. To take a "fix" or bearing on a distant object is appreciably more difficult with a bearing circle than with a cross-hair telescope.

It is among the features of novelty and advantage of the present invention to provide a novel, simple and cheap alidade construction including a cross-hair telescope mounted or associated with a compass card or repeater compass to permit the taking of accurate bearings from any distant object or reference point.

Among the further features of novelty and advantage of the invention herein are the provisions of a demountable alidade mount which can be applied to standard compass structures including repeater compasses, so that direction bearings can be taken by one operator instantaneously and without requiring extra help or mathematical calculations.

A special feature of novelty and advantage of the present invention resides in the manner of taking bearings wherein the desired bearing can be set on an alidade and the craft can "ride" into the bearing rather than taking bearings every few seconds until the desired one is reached.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The above and other desired objects and advantages of the present invention will be described in the specification and illustrated in the accompanying drawings, a certain preferred form being shown by way of illustration only, but, since the underlying features may be incorporated in other specific structures and assemblies, it is not intended to be limited to the ones herein shown, unless such limitations are clearly imposed by the appended claims.

In the drawings, like numerals refer to similar parts throughout the several views of which:

Fig. 1 is a side elevation of a gimbal-mounted repeater compass with a telescopic alidade mounted thereon;

Fig. 2 is a view similar to Fig. 1 with the compass casing turned clockwise 90° and the upper parts of the casing and lower parts of the alidade mount shown in a vertical section;

Fig. 3 is an exploded view of the alidade mounting elements and cooperating compass members;

Fig. 4 is a vertical cross section of the telescope tube showing the yoke mounting therefor; and Fig. 5 is a vertical section of the telescope mounting with a modified index.

Considering the invention more in detail and as applied to a gyrocompass repeater, there is shown, in Figs. 1 and 2, a gyro repeater having a casing 10 provided with opposed trunnions 12 and mounted on yoke 14. The casing may be counterweighted, as indicated at 16, so that the device will normally stand upright, and is provided with a clamping ring or bezel 18 securing an annular holder 20 in place against rim or collar 22 of the casing 10. The bezel 18 is provided with the usual lubber line markings 17, and an azimuth scale 19. The holder or ring 20 serves as a mounting for spaced glass plates or windows 24, 26 which are imbedded or secured in suitable gasket material 28. The repeater compass will include the usual step by step repeater motor 30 mounted inside the casing 10 on brackets 32 and driven by current from a transmitter on a master gyrocompass, not shown, through cable 34. The motor drives reduction gearing 36, mounted in spider arm 38, for rotating compass card 40. The compass card is mounted for rotation in bearing 42 on the repeater motor casing. The usual synchronizing or setting knob 44 is shown for resetting the card when pushed in to bring crown gear 46 into contact with gearing 36. The crown gear 46 is normally held out of engagement with the reduction gearing by spring 48.

The apparatus described immediately above is substantially standard equipment, and the specific form illustrated is that of a Sperry gyrocompass repeater.

The improvements of the present invention involve the mounting of a telescopic alidade or transit to turn about a vertical axis coaxial with the axis of rotation of the compass card. For this purpose, the improvements herein comprehend the mounting on the compass card 40, of a boss or plate 50. The boss 50 may comprise a disc or washer secured in place, as by rivets 52, or otherwise. Additionally, it may be formed integrally with the compass card 40. A stud 54 is centrally mounted in the member 50 for rotation therewith and is provided with a slot 56 or other coupling means. The only other alteration in the standard compass structure is the cutting of aligned apertures 25, 27 in the geometrical center of the windows 24, 26. A water-tight nut 60 is set in the so-formed aligned center apertures of the repeater glasses. This nut has a bearing flange 61 and a locking ring or flange 62. Gasket material 64 is disposed between the repeater glasses 24, 26 and the locking ring 62 to provide a watertight fitting. The nut is internally threaded at 65 to receive plug 66 having cooperating thread 67. The plug 66 provides a water-tight closure for the repeater glasses when the alidade is not in use. The specially prepared compass or repeater compass will be seen to be otherwise standard in every respect and to be susceptible of its ordinary use without modification of its essential parts or construction.

The alidade or theodolite comprises the usual telescope tube 70 having objective 72 and eyepiece 74. The barrel of the tube is provided with the usual cross hairs, not shown, and is mounted in a collar or yoke 76 provided with horizontal trunnions 78. The trunnions are mounted for rotation in appropriate bearings 84 seated in notches in the ends of legs 81, 82 of U-shaped yoke 80. Bearing clamps 83 are secured in place over said bearings as by set screws 86. To clamp the telescope on any desired angular elevation, I have shown the extension 85 of one trunnion threaded to receive wing nut 87 and the other extension 85' tapped to receive set screw 88 on which is mounted indicator arrow 90. A scale 91 comprising a quadrantal vertical arc, as shown, is mounted on leg 82 of yoke 80 secured in place by rivets or screws 92.

Detachable means are provided for causing the compass card to turn the sighting means or telescope in azimuth, when desired. To this end yoke 80 is mounted on a post or shaft 94, the lower end of which is formed as a generally cylindrical cap 95. The cap has a bearing surface 96 at its bottom or open end, and an inner cylindrical bearing surface 97. An internal centering stud 93 is formed internally of the cap. An index or indicator arm 105 is secured on cap 95, as by rivets 107. The indicator arm has a finger or index 109 which is in the exact vertical plane of the central longitudinal axis of the telescope 70. This vertical axis will also coincide with the axis of rotation of the compass card 40 and the stud 54 mounted thereon.

The alidade support is rotatably mounted on the compass windows or glasses in the following manner. Tube or sleeve 110 of brass, aluminum, or any other suitable metal, is screw-threaded at one end, as indicated at 111, for engagement with screw thread 65 of clamp 60. The tube 110 is coaxial with collar 95 and post 94 of the alidade support and with the axis of compass card 40.

Adjacent its upper end, the tube, or hollow post, is provided with an external flanged collar 112 having a bearing surface upon which bearing surface 96 of cap 95 may freely move, cap 95 in combination with tube 110 and its flange 112 hence constituting a mounting for the sighting means permitting rotation of the sight with or independently of the compass card about its axis. The upper periphery of the tube, indicated at 113, is adapted to provide a bearing surface for the inner surface 97 of the cap 95. While these surfaces have been shown as lapped bearing surfaces, the bearings may be provided by appropriate thrust and side antifriction ball or roller bearings. The supporting post or tube 110 will be screwed in place in the water-tight nut 60 and the alidade support or yoke 95 fitted thereon. The alidade telescope 70 is thus freely rotatable on the post or support 110, and the index 109 of the indicator arm will coact with the markings of the compass card 40 to give correct bearings.

The alidade telescope is not only freely movable but is adapted for mutual movement and rotation by and with the compass card. To this end, a shaft 115 having an end key section 116 is fitted into the slot 56 of stud 54, mounted on compass card 40. The shaft 115 will be of sufficient length so that its upper or free end 117 will extend above centering stud 93 of cap 95. The upper end of shaft 115 will desirably have a frictionless or low-friction bearing engagement with the inner surface of centering stud 93. The stud 93 may comprise an internal collar into which shaft 110 is received in aligned bearing engagement. The cap is provided at one side with a threaded aperture 98 adapted to receive set screw 101, aperture 98 being preferably aligned with centering stud 93. By tightening the screw with thumbpiece 100, the stud 94 and its supported telescope are clamped to rod 115 which has its lower end nonrotatably engaging the slot 56 in boss 54. Preferably a second set screw 102 is provided to fix the telescope when not in use, said screw when screwed in engaging fixed sleeve 110. These screws are preferably provided with intermeshing gears 104, 106, so that both cannot be engaged at the same time and thus throw the repeater compass out of step. When knob 100 is rotated clockwise, screw 101 will be moved into engagement with shaft 115 thereby locking cap 95 to the shaft. Simultaneously, the screw 102 will be rotated counter-clockwise in its threaded aperture 99, out of engagement with post 110. Upon rotating knob 100 counter-clockwise, screw 101 will be moved out of engagement with shaft 115 and screw 102 will be moved into engagement with the upper section 113 of post or supporting shaft 110. The knob 100 may be rotated to an intermediate position so that there is no locking engagement of either screw 101 or screw 102 with shaft 115 or post 110.

With the mounting system shown, it will be seen that in the unlocked position the telescope 70 is rotatable in azimuth around the axis of the compass card and its compass bearing can be read where accurate bearing is wanted. The clamp screws controlled by knob 100 are rotated so that screw 102 is moved to maintain cap 95 and post 110 in locking engagement. This permits the individual operator to make his fix or reading and then read the bearing from the compass card. Where it is desired to bring the alidade to a desired bearing point, the knob 100 will be rotated to lock shaft 115 and cap 95 together and unlock cap 95 and post 110. In this locked position, movement of compass card 40 will rotate shaft 115 and telescope 70 through its mountings 94, 95.

As shown in Fig. 5, a modified pointer construction may be used. In this construction, a pointer or dial hand 120 has an apertured hub 121 which is fitted on and over stub post 54. The pointer is freely rotatable about the post and may be prevented from vertical displacement by a transverse pin 122 inserted through the stub post 54 above the upper surface of the hub 121. The hub 121 is provided with one or more apertures 123 adapted to receive finger 124 of arm 125 secured to the lower portion of centering stud 93 and movable therewith. The arm 125 may desirably be formed as a single arcuate cylindrical section, as indicated by the dotted lines 126, in order to provide the necessary structural strength and prevent whip or friction, as would be the case were a single rod or finger used, and any binding developed between the several parts.

With the improved intermeshed control of the locking device, it is impossible to freeze the mechanism so that the compass card, driven by the repeater motor, would be locked or braked against the fixed post 110.

As indicated hereinabove, the improved alidade is demountable and can be stored when not in use. The plug 66 is set in place, and the repeater compass is then used in the normal way. To assemble the alidade, the shaft 115 is inserted in slot 56. The post 110 is then fitted over the shaft and screwed into the nut 60. Cap 95 is fitted on the top of the post, riding on collar 112. When the device is to be disassembled, the cap is removed and the post 110 unscrewed from nut 60. The shaft 115 is then removed and the plug is screwed back into the nut.

In use, with the device properly assembled, bearings are taken by revolving the telescope until the reference object is in the cross hairs of the telescope. The clamp screw 101 is tightened and the bearing is taken from the pointer 109 or 120 as the case may be. In following a prescribed course, the device may be used to insure turning at the proper bearing points in the following manner. The telescope is turned until the pointer is on the desired heading on the compass card. The clamp screw 101 is locked and left in that position. When the object or reference moves into the cross hairs, the desired bearing point has been reached. This is called "riding" into the bearing as explained above. When relative bearings, with respect to the ship only, are desired, the compass card may be arbitrarily set at 0° heading relative to the lubber lines 17—17 by the knob 44, and screw 101 tightened with the telescope pointed fore and aft as indicated by the position of the index 109 relative to the lubber lines 17—17. Then the telescope is rotated to bear on the object carrying with it card 40. The difference between the bearings can then be read directly on the compass card by reading the compass point opposite one of the lubber lines 17—17. For celestial navigation, the altitude of stars can be obtained by sighting with the telescope, tightening the clamp screws to hold the bearing, and reading the altitude from the scale 91. When it is desired to find a known star or Venus in the day time, the telescope is set at the correct bearing and approximate altitude and a sight is taken through the telescope.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro-compass repeater having a glass cover, the combination with a repeater compass card, of a central boss thereon, a shaft coupled to the boss, a central threaded clamp nut through the center of said cover, means connected with said nut including a supporting tubular post having a bearing flange surrounding the shaft, sighting means, means mounting said sighting means for free rotation on the bearing flange of said post independently of the compass card, and clamping means for detachably securing the sighting means mounting to the said shaft.

2. An alidade attachment for repeater compasses as claimed in claim 1, having alternative clamping means for clamping said sighting means mounting to said post.

3. In a gyro-compass repeater having a glass cover, the combination with a repeater compass card, of a central boss thereon, a shaft adapted to be detachably coupled to the boss, a central threaded clamp nut through the center of said cover, means connected with said nut including a supporting tubular post, sighting means, means mounting said sighting means for free rotation on said post independently of the compass card, and clamping means for detachably securing the sighting means mounting to the said shaft, whereby said sighting means may be coupled to said card to rotate therewith or be freed therefrom for independent setting.

4. In a repeater compass, in combination with a mounting, a driving shaft, a compass card mounted to rotate with said shaft, a second shaft detachably mounted on said card and rotatable therewith, a tubular sheath for the second shaft fixed relative to said mounting, a revolvable cap mounted on the sheath, an index mounted upon the cap so as to rotate therewith in a plane parallel to the card, a sighting means attached to the cap and movable with the index, and means for locking the cap to said sheath on to the said rotatable second shaft, as desired.

DAVID JASSY.

REFERENCES CITED

The following references are of record in the file of this patent:

UNITED STATES PATENTS

| Number | Name | Date |
| --- | --- | --- |
| 151,856 | Croudace | June 9, 1874 |
| 808,270 | Arbecam | Dec. 26, 1905 |
| 1,010,339 | Angel | Nov. 28, 1911 |
| 1,474,394 | Warburg | Nov. 20, 1923 |
| 1,773,808 | Davis | Aug. 26, 1930 |
| 2,015,627 | Hug | Sept. 24, 1935 |

FOREIGN PATENTS

| Number | Country | Date |
| --- | --- | --- |
| 977 | Great Britain | Mar. 17, 1873 |
| 27,145 | Great Britain | Nov. 19, 1897 |
| 27,613 | Great Britain | Dec. 15, 1902 |
| 133,047 | Great Britain | Dec. 24, 1920 |
| 322,497 | Great Britain | Dec. 6, 1929 |
| 594,563 | France | June 27, 1925 |